S. J. BARTON.
TIRE.
APPLICATION FILED OCT. 12, 1917.

1,321,879.

Patented Nov. 18, 1919.

Witness:
John Enders

Inventor:
Silas J. Barton
by Fred Gerlach
his Atty.

UNITED STATES PATENT OFFICE.

SILAS J. BARTON, OF CHICAGO, ILLINOIS.

TIRE.

1,321,879. Specification of Letters Patent. Patented Nov. 18, 1919.

Application filed October 12, 1917. Serial No. 196,098.

*To all whom it may concern:*

Be it known that I, SILAS J. BARTON, a citizen of the United States, and a resident of Chicago, in the county of Cook and State of Illinois, have invented certain new and useful Improvements in Tires, of which the following is a full, clear, and exact description.

The invention relates to vehicle tires.

One object of the invention is to provide an improved tire which is adapted for use on automobiles without being inflated, so that the difficulties encountered in tires which collapse when deflated will be overcome.

Another object of the invention is to provide an improved inner tube or member which is adapted to be placed within an outer or protective casing of usual construction and which contains supporting walls which are resilient but will suffice to yieldingly support the vehicle in the event the envelop of the inner member should become torn or punctured.

Other objects of the invention will appear from the specification.

The invention consists in the several novel features hereinafter set forth and more particularly defined by claims at the conclusion hereof.

Figure 1:
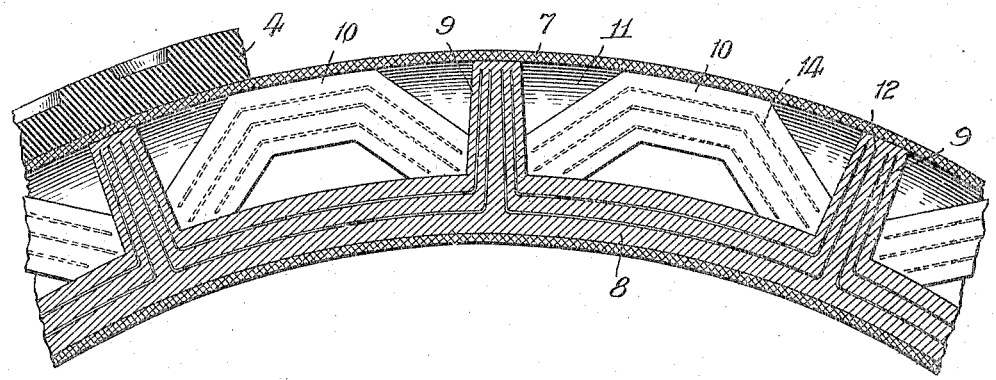
Figure 2:
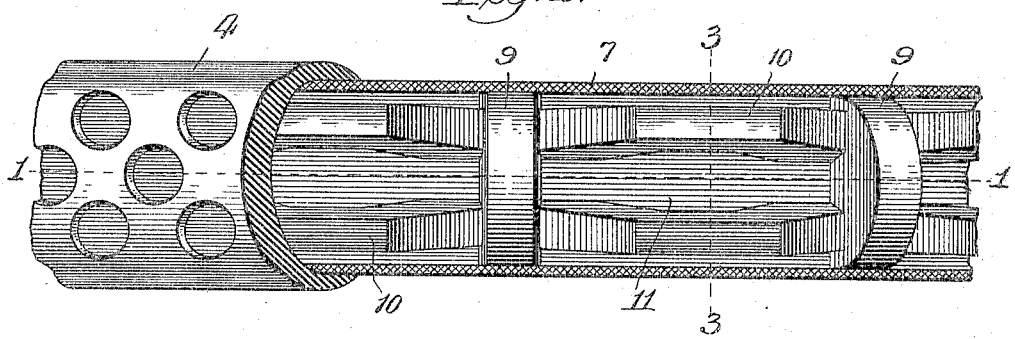
Figure 3:
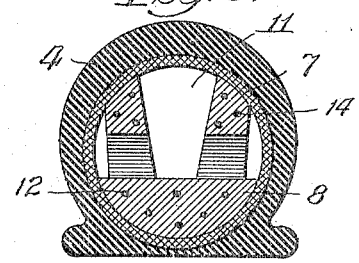

In the drawings: Figure 1 is a longitudinal section taken on line 1—1 of Fig. 2 of a portion of a tire embodying the invention. Fig. 2 is a plan, parts being broken away. Fig. 3 is a transverse section taken on line 3—3 of Fig. 2.

The invention is illustrated as applied to an inner annular member adapted to be placed within the outer casing 4 which may be of any suitable or usual construction, being usually built up of a fabric and rubber. The base of this outer member is formed to fit within any suitable rim as well understood in the art.

The inner member of the tire consists of a tube 7 formed of fabric and rubber, so that it will be durable and serve as a container for a supporting core therein. This core comprises a base portion 8, cross walls 9 and longitudinal arches 10 having their apices extended to support the outer portion of the tube 7 and their ends joined to the corners between the cross walls and the base. The cross walls 9 extend between the base 8 and the tube, dividing the space in the latter into compartments or cells 11. There is a longitudinal arch 10 adjacent each side of each compartment, so they will be effective in resiliently supporting the tread-portion of the tire.

In the manufacture of the tire the base, cross-walls and arches forming the core are molded or vulcanized together and are suitably reinforced by fabric. This fabric may extend through the cross-walls and base, as illustrated at 12. The arches may be reinforced as indicated at 14. The cross walls and arches are tapered outwardly, so that in molding, the mold-sections can be withdrawn from the product and furthermore, by forming the base portions of the arches and the cross walls thicker than the outer portions these parts serve more effectively to support the outer portion of the tire. When the core, with its integral base, cross-walls and arches, has been formed, the tube 7 of fabric and rubber is built around and vulcanized to the core.

The tube 7 containing the core with its base, cross-walls and arches, may be placed into an outer casing 4 of usual construction similar to an inflatable tube, as well understood in the art. When this inner member is placed in the tire, the cross-walls and arches will serve to yieldingly support the load without being inflated. As a result, if the tube 7 should become punctured or torn, the tire will still be operative substantially as before.

The invention exemplifies a vehicle tire in which an inner member containing a resilient supporting structure that is effective to sustain the load without depending upon inflation is adapted to be placed in an outer casing such as is usually used with inflatable tubes. Also one in which a core having longitudinal arches forms a resilient supporting structure between the base and tread.

The invention is not to be understood as restricted to the details set forth, since these may be modified within the scope of the appended claims, without departing from the spirit and scope of the invention.

Having thus described the invention, what I claim as new and desire to secure by Letters Patent, is:—

1. In a tire, the combination of a covering, and a rubber core within said covering comprising a continuous base-portion and longitudinally extending arched portions.

2. In a tire, the combination of a covering, and a rubber core within said covering comprising a continuous base-portion and longitudinally extending outwardly arched portions.

3. In a tire, the combination of a covering, and a rubber core within said covering, comprising a continuous base portion, continuous cross walls, and longitudinally extending arches.

4. In a tire, the combination of a covering, and a rubber core within said covering, comprising a continuous base portion, continuous cross-walls, and longitudinally extending outwardly arched portions between the cross walls.

5. In a tire, the combination of a covering, and an elastic core within said covering, comprising a base-portion, cross walls, and longitudinally extending arched portions and reinforcements in the arches and cross-walls and base.

6. In a tire, the combination of a covering, and a rubber core within the covering comprising a continuous base and longitudinal series of arches at the sides of the base and extending between the base and the covering the base and arches being integral.

7. In a tire, the combination of a covering and a core within the covering comprising a base, cross-walls and a longitudinal series of arches at each side of the base and extending between the corners of the base and the cross-walls and the covering.

8. In a tire, the combination with an outer casing, of a removable inner tube having a core therein, the core comprising a base portion and cross-walls and longitudinal portions between the base and the tread portion of the tube.

9. In a tire, the combination with an outer casing, of a removable inner tube having a core therein, the core comprising a base portion, and cross-walls and longitudinally extended arched-portions.

SILAS J. BARTON.